United States Patent [19]

Lingier et al.

[11] 4,233,418
[45] Nov. 11, 1980

[54] PROCESS FOR PREPARING RUBBER-MODIFIED STYRENE COPOLYMERS BY SUSPENSION COPOLYMERIZATION

[75] Inventors: Willy F. R. Lingier, Beersel; Emmanuel Lanza, Brussels; William J. I. Bracke, Hamme, all of Belgium

[73] Assignee: Cosden Technology, Inc., Big Spring, Tex.

[21] Appl. No.: 911,101

[22] Filed: May 31, 1978

[51] Int. Cl.$^3$ ............................. C08F 6/00; C08J 3/00
[52] U.S. Cl. ..................... 525/243; 525/244; 525/260; 525/261; 525/263; 525/265; 528/502
[58] Field of Search .............. 260/880 R; 525/243, 525/260, 261, 263, 264, 265, 244; 528/502

[56] References Cited

U.S. PATENT DOCUMENTS

| | | | |
|---|---|---|---|
| 3,068,192 | 12/1962 | White | 260/879 X |
| 3,243,481 | 3/1966 | Ruffing et al. | 260/880 R |
| 3,891,609 | 6/1975 | Wolfe et al. | 260/880 R |
| 3,914,339 | 10/1975 | Shima et al. | 260/880 R |
| 3,935,136 | 1/1976 | Childers et al. | 260/880 R |
| 4,007,234 | 2/1977 | Schuddemage et al. | 525/243 |
| 4,055,713 | 10/1977 | Moczygemba et al. | 260/880 R |

FOREIGN PATENT DOCUMENTS 50-2775   1/1975   Japan ........................... 525/243

*Primary Examiner*—William F. Hamrock
*Attorney, Agent, or Firm*—Schwartz, Jeffery, Schwaab, Mack, Blumenthal & Koch

[57] ABSTRACT

Disclosed is a process for the production of rubber-modified styrene copolymers, particularly high rubber content styrene copolymers, such as high rubber content ABS polymers, by suspension polymerization, comprising suspension polymerizing an admixture of polymerizable materials comprising styrene monomer, rubber polymer, and optional additional monomers copolymerizable therewith; and melt extruding the resultant rubber-modified styrene copolymer under extrusion conditions having a shear force sufficient to homogeneously disperse the rubber phase throughout the copolymer. Through the use of the process of the instant invention, high rubber content styrene copolymers may be produced in a single suspension step, with impact properties and surface appearance comparable to copolymers produced in the conventional two-step polymerization process.

48 Claims, No Drawings

PROCESS FOR PREPARING RUBBER-MODIFIED STYRENE COPOLYMERS BY SUSPENSION COPOLYMERIZATION

BACKGROUND OF THE INVENTION

The present invention relates to a process for the production of rubber-modified vinyl aromatic copolymers, particularly rubber-modified styrene copolymers having improved surface appearance and impact properties. More particularly, the present invention relates to the copolymerization of vinyl aromatic compounds in the presence of an elastomer in a single suspension copolymerization step.

Two of the most widely known impact polymers are high impact polystyrene, a copolymer comprising styrene monomer and rubber polymer in which particles of grafted rubber are homogeneously dispersed in a continuous phase of polymerized styrene monomer, and ABS polymers, a copolymer comprising styrene monomer, acrylonitrile, and a rubbery polymer in which particles of grafted rubber are homogeneously dispersed in a continuous phase comprising styrene-acrylonitrile copolymer. These polymers have found numerous commercial applications because of their unusual combination of chemical and physical properties, particularly their excellent mechanical properties, such as impact strength. It is well known in the art that high impact polystyrene and ABS polymers can be prepared according to any of the usual styrene monomer polymerization processes, such as mass (bulk), emulsion, or suspension polymerizations. However, such conventional polymerization methods have certain disadvantages associated therewith which renders their use undesirable for the commercial preparation of rubber-modified vinyl aromatic copolymers. In emulsion polymerization, recovery of the copolymer is very difficult, requiring coagulation of the latex, separation of the waste water phase, and drying of the polymer. While suspension polymerization overcomes the recovery problems associated with emulsion polymerization, resins prepared by suspension copolymerization have been found to exhibit poor impact properties as the amount of rubber which can be successfully incorporated therein is too small. It is well known in the art that the essential properties of rubber-modified vinyl aromatic copolymers are dependent on many factors, and are particularly dependent upon the concentration of rubbery polymer, which confers shock absorbing and impact resistance properties to the resin, which can be incorporated therein, and on the degree of dispersion of the rubbery particles in the resin. With conventional suspension polymerization processes, the small amounts of rubbery polymer which can be successfully incorporated into the product resin produces copolymers having less than desirable impact properties and surface appearance. Typical examples of prior art suspension polymerization processes are disclosed in U.S. Pat. Nos. 3,047,534; 3,627,855; and, 3,786,115. Similarly, bulk or mass polymerization processes are limited in the amount of rubber that can be grafted. A variation of the conventional bulk polymerization process is described in U.S. Pat. No. 2,606,163, in which the impact strength, tensile strength, and percent elongation values of styrene copolymers comprising 85 to 98 parts by weight of styrene and from 1 to 15 parts by weight of a rubbery polymer are improved by mechanically working the copolymer, such as by milling the bulk-polymerized copolymer or by mechanically stirring the reaction mixture during the bulk polymerization.

Heretofore, it has been the usual practice in the prior art to produce rubber-modified vinyl aromatic copolymers in a two-step polymerization process comprising a bulk prepolymerization first stage, and a suspension polymerization second stage. In this two-step process, the elastomer or rubber is first dissolved in monomer, such as styrene and mixtures thereof with other monomers copolymerizable therewith, followed by a polymerization in bulk up to a degree of conversion depending on the molecular weight and the concentration of the rubber. The resulting bulk prepolymer is then suspended in water and the polymerization is continued under suspension conditions until complete conversion of the reactants to the rubber-modified copolymer is obtained. Representative of this type of polymerization process for rubber-modified copolymers are the polymerization processes disclosed in U.S. Pat. Nos. 3,428,712; 3,660,534; 3,696,172; and 3,781,383.

While the foregoing two-step polymerization process has been found to be advantageous for the production of rubber-modified copolymers having a low rubber concentration, on a commercial scale this polymerization process has encountered several significant difficulties which preclude the use of this process in the preparation of rubber-modified copolymers having a rubber concentration of greater than approximately 10%. In large industrial reactors, the viscosity of the mass at the time of phase inversion and suspension must not be too high, since a highly viscous mass often exceeds the economically feasible stirring capacity of the reactor, and is very difficult to uniformly disperse into suspension. Accordingly, the commercial production of rubber-modified styrene copolymers by the two-step polymerization process has been limited to the production of copolymers having a rubber concentration of less than about 10% rubber by weight. As a result, the quality of the rubber-modified styrene copolymers obtained by this two-step process are inferior when compared to copolymers prepared by emulsion polymerization, particularly with respect to impact strength, especially low-temperature impact strength, and surface gloss appearance.

There exists a great need in the art, therefore, for a polymerization process for the production of high rubber content styrene copolymers, which eliminates the difficulties and disadvantages of the aforementioned conventional polymerization processes, and enables impact polymers having large rubber concentrations and exhibiting excellent physical properties, such as impact strength and surface appearance, to be produced.

SUMMARY OF THE INVENTION

Accordingly, it is an object of the present invention to provide a new and improved process for the production of rubber-modified styrene copolymers.

It is a particular object of the present invention to provide a new and improved process for the production of high impact polystyrene and ABS copolymers.

Another object of the instant invention is to provide a process for the production of rubber-modified styrene copolymers by suspension polymerization.

A specific object of the present invention is to provide a suspension polymerization process for the simple and economic production of impact polymers which have a high rubber concentration and which exhibit excellent impact properties and surface appearance.

As especial object of the present invention is to provide a process for the production of high rubber concentration impact polystyrene and ABS polymers which exhibit good impact properties and surface appearance.

In accomplishing the foregoing, and other objects, there has been provided in accordance with the present invention a process for the production of rubber-modified vinyl aromatic copolymers by suspension polymerization, comprising the steps of forming an aqueous suspension of an admixture of polymerizable materials comprising vinyl aromatic monomer and rubbery polymer; suspension polymerizing the admixture of polymerizable materials at a temperature between about 60° to about 150° C. to produce a rubber-modified vinyl aromatic copolymer; recovering the copolymer from the suspension; and, melt extruding the copolymer under extrusion conditions having a shear force sufficient to homogeneously disperse the rubber phase throughout the copolymer. Through the use of the process of the instant invention, applicants have found that high rubber content vinyl aromatic copolymers, particularly styrene copolymers, may be produced in a single suspension step, without the detrimental effect on the impact properties and surface appearance attendant copolymers produced by conventional suspension polymerization processes, the viscosity problems attendant the conventional bulk and two-step polymerization processes, and the recovery problems associated with emulsion polymerization. In fact, the process of the instant invention yields impact polymers having impact properties and surface appearance superior to copolymers produced in the conventional two-step polymerization process, and enables the production of impact polymers having rubber concentrations which are commmercially unfeasible with the use of the two-step polymerization process, or with the conventional bulk or suspension polymerization processes.

Broadly, the process according to the instant invention is highly suitable for use in the preparation of any of the rubber-modified vinyl aromatic copolymers well known in the art. As used herein, the term "rubber-modified vinyl aromatic copolymers" refers to any of the large number of copolymers formed by copolymerizing a vinyl aromatic monomer, such as styrene, with a rubbery polymer. Such copolymers may also further comprise additional monomers which are copolymerizable with the vinyl aromatic monomer and rubber, such as, for example, acrylonitrile monomers, methacrylate monomers and mixtures thereof. Minor amounts of other polymerizable vinyl substances, such as vinyl chloride, vinylidene chloride, vinyl acetate, and vinyl propionate, which do not adversely affect the polymerization reaction, may also be present in the reaction mixture.

As also used herein, the term "vinyl aromatic monomers" refers to any of the vinyl aromatic, styrene-like compounds well known in the art, such as styrene, substituted styrenes, alpha-methyl styrene, para-chlorostyrene, vinylpyridine, vinylnaphthalene, and derivatives thereof that are free from nuclear substituents which interfere with the production of the desired impact vinyl aromatic polymers of the instant invention. Specific examples of such vinyl aromatic compounds include alkyl styrenes, such as o-ethylstyrene, para-methylstyrene, meta-methylstyrene, para-ethylstyrene, para-isopropylstyrene; halo styrenes such as 2,3-dichlorostyrene, ortho-chlorostyrene, para-chlorostyrene, aryl-dichlorostyrene, para-fluorostyrene, para-bromostyrene; and, aryl-substituted styrenes such as aryl-dimethylstyrene and mixtures thereof. For the purposes of the present invention, however, the preferred vinyl aromatic compound is styrene. Likewise, the terms "acrylonitrile monomer" and "methacrylate monomer" are used in a generic sense, referring to any of the isomeric and substituted forms of these monomers such as the lower alkyl esters thereof, for example, methacrylonitrile, methylmethacrylate, ethylmethacrylate, butylmethacrylate, etc.

Generally, the process of the invention may be advantageously employed for the production of rubber-modified styrene copolymers having a wide range of rubber concentrations, including not only copolymers having high rubber contents, but also those copolymers having small concentrations of rubber. The instant process is particularly advantageous, though, for use in the preparation of rubber-modified styrene copolymers, particularly high impact polystyrene and ABS polymers, which have high rubber contents, particularly those having rubber concentrations of over 10% by weight. The process of the present invention is also highly suitable for the preparation of impact styrene copolymers of the type having lower concentrations of special rubbers, such as SBR and nitrile rubbers, the so-called low conversion type copolymers. Applicants have found that by extruding the copolymer beads under extrusion conditions of high shear force, the problems of poor impact properties and surface appearance which have heretofore prevented the commercial application of suspension polymerization for the preparation of these high rubber content copolymers, may be overcome, producing in fact copolymers having impact strength and surface appearance superior to those obtained by the conventional two-step procedure. Accordingly, the present invention provides a particularly efficient method for the preparation of high rubber content impact polymers, such as impact polystyrene and ABS polymers. In view of the highly desirable physical and chemical properties of high rubber content impact polymers, and the resulting large commercial demand therefor, the present invention thus provides a much needed contribution to the impact polymer polymerization art.

Other objects, features, and advantages of the present invention will become apparent to the skilled artisan upon examination of the following detailed description of the present invention.

DETAILED DESCRIPTION OF THE PREFERRED EMBODIMENTS

The present invention provides a process for the preparation of rubber-modified styrene copolymers, such as high impact polystyrene and ABS polymers by suspension polymerization, which obviates the problems associated with a highly viscous mass prepolymer in the conventional two-step polymerization process, and additionally overcomes the problem of poor physical properties associated with utilization of conventional suspension and bulk polymerization processes. In accordance with the inventive concepts of the instant invention, applicants have found that if a solution of rubber in styrene monomer and/or other additional monomers copolymerizable therewith, such as acrylonitrile, is first suspension polymerized without a mass prepolymerization step, and the resulting copolymeric material is then melt extruded under extrusion conditions having a shear force sufficient to produce a rubber-modified copolymer in which grafted rubbery polymer particles are homogeneously dispersed throughout a continuous phase of polymerized monomer, the aforementioned deficiencies of the prior art may be overcome. In contrast to the two-step polymerization process which has been the customary process for the preparation of the instant polymers, the problems associated with a highly viscous mass prepolymer are obviated through the elimination of the mass prepolymerization stage, without sacrificing the impact strength and surface appearance of the resulting copolymers, as in conventional suspension polymerizations. This advantage is achieved in accordance with the present invention by allowing the inversion of the rubber phase of the copolymer to occur within the extruder, rather than within the polymerization reactor, as in the two-step polymerization process. In other words, in the process of the instant invention, the rubber is homogeneously dispersed from a continuous to a discontinuous phase within the extruder, rather than in the polymerization reactor. This feature completely eliminates the problems attendant to suspending a highly viscous prepolymer mass and the stirring thereof.

Moreover, by extruding the resultant suspension copolymers with a high shear force sufficient to homogeneously disperse the rubber material throughout the copolymer, the impact properties and surface appearance of the resultant impact polymer are significantly improved over that characteristic of impact polymers produced by conventional suspension polymerizations. In one-step suspension polymerizations wherein a mass prepolymerization stage is not employed, the rubbery polymer forms a network throughout the entire resin. Accordingly, impact polymers produced in a single suspension step have undesirably low impact strengths and surface appearance. Since in the instant invention a rubber polymer is homogeneously dispersed throughout the copolymer during the high shear extrusion step, rubber-modified styrene copolymers may be prepared which exhibit excellent impact strengths and surface appearance.

As has been aforementioned, the process according to the instant invention is highly suitable for use in the preparation of any of the rubber-modified styrene copolymers well known in the art, and may be successfully employed for the production of copolymers of this type having not only high rubber concentrations, but also those copolymers having small amounts of rubber therein. Broadly, polymers producible by the instant process include any of the large number of copolymers formed by polymerizing a styrene monomer with a rubbery polymer, and optional additional monomers which are copolymerizable therewith. The rubbery polymer may comprise any of those polymerized dienes known in the art to be suitable for the preparation of the instant type of polymers. By way of illustration, but not of limitation, examples of suitable rubbery polymers for use in the instant invention include the rubbery homopolymers and copolymers of butadiene, such as polybutadiene, butadiene-styrene, butadiene-acrylonitrile, butadiene-methacrylonitrile, and terpolymers, such as butadiene-styrene-methacrylonitrile terpolymers. Other examples of suitable rubbers include polyisoprene, polypiperylene, poly-2,3-dimethylbutadiene, polyisobutylene, polychloroprene, polycyclopentadiene, natural rubbers, chlorinated rubber, acrylic rubbers and copolymers of styrene with isobutylene, and copolymers of butadiene with isobutylene. Also suitable for use as the rubbery polymer are ethylene vinyl acetate monomer (EVA) polymers and ethylene propylene diene monomer (EPDM) polymers. Particularly preferred for the purposes of the present invention are polybutadiene and styrene-butadiene rubbers, a copolymer typically containing from 20 to 30% styrene and 70 to 80% butadiene. The amount of rubbery polymer used to prepare the impact polymers of the instant invention may comprise up to about 50% by weight rubber, based on the total weight of monomeric and rubbery components present in the polymerization mixture. Preferably however, the rubbery polymer is used in a concentration of from about 3 to 50% by weight, more preferably 10 to 40% by weight, and most preferably 20 to 30% by weight. As has been aforementioned, the present invention is uniquely suitable for the preparation of rubber-modified styrene copolymers containing concentrations of rubber greater than about 10% by weight. Moreover, as has also been aforementioned, the present invention also provides a highly efficient process for the preparation of impact copolymers of the type having lower concentrations of special rubbers, such as SBR and nitrile rubbers, the so-called low conversion type copolymers, and can be used for example to prepare clear high impact polymers without the necessity of blending with crystal polystyrene. Accordingly, it is to be emphasized that the present invention provides a highly efficient process for the preparation of rubber-modified impact copolymers having a wide range of rubber concentrations.

The styrene monomer or styrene-like compound may comprise any of the vinyl aromatic compounds well known to the art. Suitable examples of these compounds include styrene, alpha-methylstyrene, vinylnaphthalene, chlorostyrene, vinylpyridine, alkylated styrene, and other derivatives thereof that are free from nuclear substituents which interfere with the production of the desired impact vinyl aromatic polymers of the instant invention. Specific examples of suitable vinyl aromatic compounds include styrene, alkyl styrenes, such as o-ethyl-styrene, para-methylstyrene, meta-methylstyrene, para-ethylstyrene, para-isopropylstyrene; halostyrenes such as 2,3-dichlorostyrene, ortho-chlorostyrene, para-chlorostyrene, para-fluorostyrene, para-bromostyrene; and, aryl substituted styrenes, such as aryl-dimethylstyrene and aryl-dichlorostyrene. Preferably, however, the vinyl aromatic compound employed as the styrene-like monomer is styrene.

Other polymerizable monomers may also be present in the polymerization mixture which do not adversely affect the polymerization reaction or prevent the attainment of the desired polymer. Examples of such substances include acrylonitrile, methacrylate esters, esters of acrylic and itaconic acids, and mixtures thereof. Preferably, the other polymerizable monomers optionally employed in the present invention comprise acrylonitrile, and methacrylate esters, such as methyl-methacrylate, ethyl-methacrylate, butyl-methacrylate, etc. Minor amounts, for example, up to about 5%, of other polymerizable vinyl compounds, such as vinyl chloride, vinylidene chloride, vinyl acetate, and vinyl propionate, may also be present in the admixture of polymerizable materials.

Particularly preferred polymeric formulations include high impact polystyrenes, a copolymer of styrene and rubber; ABS polymers, a copolymer of styrene, acrylonitrile, and a rubbery polymer; and, terpolymers comprising styrene, methacrylate monomer, and a rubbery polymer. The high impact polystyrenes typically comprise from about 3 to 50% by weight rubbery polymer relative to the total weight of the monomeric and rubbery components present in the polymerization mixture, with the remainder of the polymerizable material being styrene. Particularly preferred are those high impact polystyrenes having a concentration of rubbery polymer of from about 10 to 40%, and most preferred are those high impact polystyrenes having a rubber concentration of from about 20 to 30% by weight rubber. The terpolymer of styrene, rubbery polymer, and methacrylate monomer will typically comprise from about 3 to 50% by weight rubbery polymer, preferably 10 to 40% by weight rubbery polymer, and more preferably 20 to 30% by weight rubbery polymer. The remainder of this terpolymer comprises styrene and methacrylate monomer, from about 40 to 60% of the total sum of styrene and methacrylate being methacrylate monomer. The ABS polymers will typically comprise from about 3 to 50% by weight rubbery polymer, preferably 10 to 40% by weight rubbery polymer, and most preferably 20 to 30% by weight rubbery polymer; from about 10 to 35% by weight acrylonitrile monomer; and from about 20 to 80% by weight styrene monomer. As has been mentioned previously, the preferred use of the process of the instant invention is the preparation of polymers of the foregoing type having a high rubber content, preferably greater than about 10% by weight, and the preparation of the so-called low conversion type copolymers discussed above, since a satisfactory method for the commercial preparation of these types of polymers has heretofore been lacking in the prior art. However, it is to be emphasized that the process of the instant invention is applicable for the preparation of impact polymers having a very wide range of rubbery polymer concentrations.

The foregoing polymerizable materials may be polymerized by any of the suspension polymerization processes well known in the art. Suitable examples of such processes are described in U.S. Pat. Nos. 3,047,534, 3,627,855, and 3,786,115, the entirety of which are herein incorporated by reference. In the usual suspension polymerization procedure, finely ground rubber polymer is dissolved in the monomer and/or admixture of monomers to produce a solution or admixture of polymerizable material. This rubber monomer solution has a viscosity which ranges between about 200 and 15,000 centipoises at 65° C. when each of the components are used in the above-specified amounts. If desired, additional useful additives may also be dissolved in the admixture of polymerizable materials, such as chain regulating agents, lubricants, aging retardants, foaming agents, dyes, fillers, coloring compounds, and other useful additives. Particularly preferred chain regulating agents are the aliphatic or aromatic mercaptans such as tertiary dodecyl mercaptan, lauryl mercaptan, nonyl mercaptan, decyl mercaptan, other alkyl mercaptans of the general formula R-SH, wherein R is an alkyl radical having from 6 to 18 carbon atoms, and mixtures thereof. Aryl mercaptans such as thiophenol, thionaphthol, and derivatives thereof are also suitable for use in the instant invention. The mercaptan chain regulating agents are generally used in amounts ranging from about 0.01 to 2.5 weight percent, and preferably from about 0.1 to 1.0% by weight. Particularly preferred for use in the instant invention is tertiary-dodecyl mercaptan.

Suitable anti-oxidants or aging retardants for use in the instant invention comprise any of the conventional anti-oxidants such as the phenolic type, the alkyl aryl phosphite type, or the dialkyl esters of thio-dipropionic acid. Examples of suitable compounds include di-tert-butyl-para-cresol, and tris nonyl phenyl phosphite. Such compounds will generally be used in an amount from about 0.01 to 1% by weight.

Lubricants which can be incorporated into the solution of polymerizable materials include refined mineral oils, paraffin wax, or mixtures of mineral oils and hydrocarbon oil, or ester lubricants, such as butyl stearate, in amounts of from 0.5 to 4% by weight.

The remaining optional additives such as the dyes, fillers, and coloring compounds may comprise any conventional material well known to those skilled in the art. Suitably, these compounds are used in a quantity less than about 1%.

After preparation of the rubber-monomer solution, the reactor is purged with nitrogen and, with continued agitation of the solution of polymerizable material, a quantity of water is pumped into the reactor and mixed with the polymerizable material. An aqueous dispersion of a suspending agent and a surfactant agent is added thereafter to form the aqueous suspension of polymerizable materials in which the polymerizable material is broken up into small droplets by agitation of the suspension. The aqueous suspension is then polymerized for a period of from about 5 to 24 hours at a temperature of from about 60° to 150° C. with continuous agitation until substantially completely polymerized polymer beads are produced. Thereafter, the finished polymer particles can be recovered in a pure state by separating them from the aqueous medium by filtration, washing with an acid such as dilute hydrochloric acid or warm water, followed by drying in a vacuum oven. The water in the suspension system can vary widely, but the system is most economically operated in a ratio range of from about 2 down to about 0.7 parts of water per part of polymerizable material. Moreoever, during the polymerization, the temperature of the system may be increased as desired.

Particularly favorable results are obtained, however, by first polymerizing the aqueous suspension of polymerizable materials at a temperature within the range from about 120° to 135° C. for a period of time sufficient to produce beads of copolymer having a specific gravity higher than that of the aqueous phase, and then thereafter increasing the reaction temperature to a temperature from about 1° to 15° C. higher. Reaction is then continued to substantial completion.

In order to produce a copolymer bead in which the rubber polymer can be satisfactorily homogeneously dispersed from a continuous phase to a discontinuous phase by extrusion and in accordance with the practice of the instant invention, the foregoing process conditions must be adjusted to produce polymer beads having a degree of conversion within controlled limits. Suitably, the reaction conditions are adjusted to produce copolymer beads having a concentration of residual monomers of from about 0.05 to 2% by weight, and most preferably from about 0.2 to 0.4%. Accordingly, in the preferred embodiment, the process conditions include polymerizing the aqueous suspension at a temperature within the range from about 120° to 135° C. for a period of from about 3 to 10 hours, after which the temperature is increased to about 121° to 150° C., at which the polymerization is continued for a period of time sufficient to produce polymer beads having a residual concentration of residual monomers within the aforementioned ranges, usually from about 2 to 5 hours.

The suspension polymerization may either be a thermal polymerization or a catalyst initiated polymerization. Preferably, the suspension polymerization is a catalyst initiated polymerization, since the use of catalysts tends to accelerate the rate of the polymerization reaction. Accordingly, in the preferred embodiment, at least one free-radical polymerization catalyst is added to the aqueous suspension of polymerizable materials during the suspension polymerization. Preferably, the polymerization catalyst is added to the aqueous suspension just prior to the higher temperature polymerization, when the degree of conversion is sufficient to produce beads of copolymer having a specific gravity higher than that of the aqueous phase. The preferred catalysts are monomer soluble and have decomposition ranges suitable for the temperature of the suspension. Peroxide catalysts have been found to be particularly suitable. Several classes of peroxide catalysts may be used such as benzoyl peroxide, chlorobenzoyl peroxide, bromobenzoyl peroxide, fluorobenzoyl peroxide, naphthal peroxide, lauroyl peroxide, myristyl peroxide, stearyl peroxide, di-tertiary-butyl peroxide, cumyl hydroperoxide, decanoyl peroxide, paramenthane hydroperoxide, tertiary butyl peroctoate, dicumyl peroxide and other peroxide catalysts well known to those skilled in the art. Also, suitable azo catalysts may be used, either alone or in combination with other catalysts. A suitable azo catalyst is azo-bisisobutyronitrile. Any effective amount of catalyst or combination of catalysts may be used; ordinarily, however, from about 0 to 2%, preferably from about 0.1 to 0.5%, based on the total weight of polymerizable material charged, of catalytic agent is satisfactory. A particularly preferred catalyst for use in the instant invention comprises dicumyl peroxide.

In forming the aqueous suspension of polymerizable material, any of the usual suspending agents, such as polyvinyl alcohol, hydroxyethyl cellulose, ammonium polyacrylate, hydroxyapatite, bentonite, polyvinyl pyrrolidone, $Al_2O_3$, ZnO, magnesium silicate, the carbonates or phosphates of calcium, barium, strontium, or magnesium, and the like may be used alone or in combination. A particularly preferred suspending agent is tricalcium phosphate. Any effective quantity of the foregoing suspending agents may be employed. Typically, these compounds will be used in a quantity from 0.01 to 5%, preferably from 0.1 to 1%. The surface active agents employed in the instant invention may be either of the ionic or nonionic type, and any conventional surface active agent known in the art may be employed in the instant invention. Suitable surface active agents include sodium dodecylbenzene sulfonate, the sulfate esters of aliphatic alcohols ranging from 6 to 14 carbon atoms, such as caproyl sulfate or octyl sulfate, fatty acid surfactants, aromatic carboxylate acid surfactants, aromatic and aliphatic organic sulfates and sulfonates, such as sodium and potassium beta-naphthalene sulfonates, sodium and potassium stearates, sodium and potassium caprolates, sodium and potassium lauryl sulfates, and other common surfactants well known to those skilled in the art. Typically, surface active agents will be used in quantities from about 0 to 1%, and preferably from about 0.05 to 0.5% by weight. Acid or salt may also be additionally added to the suspension as required for adjusting the pH. Particularly preferred for use in the instant invention are the anionic surfactants.

The reaction mixture which is subjected to the suspension copolymerization comprises only one phase, rubbery polymer dissolved in the monomer. With the start of polymerization, a second phase comprising a solution of polymerized monomer is formed. After completion of the copolymerization, the resulting resin comprises polymerized monomeric material dispersed in the rubber phase. However, copolymers having this physical structure, i.e., the rubber-modified vinyl aromatic copolymers produced in conventional suspension polymerization processes, exhibit poor impact properties and surface appearance. It has been unexpectedly found, in accordance with the inventive concepts of the present invention, that the foregoing properties may be improved significantly by subjecting the copolymers produced in the suspension step to a high shearing force. ABS and impact polystyrenes treated in this fashion also exhibit improved flow characteristics, and can be molded into articles exhibiting excellent impact strength and surface appearance.

In accordance with the present invention, after polymerization, the resulting rubber-modified styrene suspension copolymer is melt extruded under extrusion conditions having a shear force sufficient to homogeneously disperse the rubber phase throughout the copolymer. In order to produce impact polymers having satisfactory impact strengths and surface appearance, it is essential that the extrusion step be conducted with sufficient shear force to homogeneously disperse the rubber polymer throughout the copolymer.

The application of a high shearing force induces a phase inversion of the copolymer resin, resulting in the formation of a uniform and homogeneous dispersion of grafted rubber particles in a continuous phase of polymerized monomeric material. In ABS copolymers, for example, the continuous phase will comprise styrene-acrylonitrile copolymer, while in rubber-modified polystyrene, for example, the continuous phase will comprise polymerized styrene monomer. The more thoroughly and stably the rubber is dispersed in the polymerized monomeric material, the higher the impact strength and better the surface appearance the copolymer will possess. By applying a high shearing force to the rubber-modified copolymers of the present invention, dispersion of the rubber particles is enhanced, enabling thereby the incorporation of up to about 50% by weight rubbery polymer in the resins.

The amount of shearing force sufficient to homogeneously disperse the rubber particles throughout the resin is a function of the size and arrangement of the extruder utilized, the rate of extrusion, the extruder temperature, and the composition of the rubber-modified copolymers, particularly the concentration of rubber polymer therein, and can vary over wide limits. In general, the shearing force required is that amount which is sufficient to produce a substantially gel-free rubber-modified copolymer. Copolymers which have not been subjected to sufficient shearing force will contain substantial amounts of gel, yielding a product resin with less than desirable properties. Accordingly, in the preferred embodiment, the rubber-modified copolymers are extruded with a shearing force sufficient to produce a substantially gel-free copolymer. The optimum shearing force necessary for a particular rubber-modified copolymer may be determined by those skilled in the art experimentally, and may then be re-employed in extruding subsequent batches of a given copolymeric formulation.

A convenient method for quantifying the exact shearing force necessary for a given polymer is in terms of the power requirement of the extruder motor, which is approximately proportional to the power absorbed by the extruder screw or screws during the high shear extrusion of the rubber-modified copolymers. By way of example, beads of ABS obtained by suspension copolymerization according to the present invention are subjected to a shearing action in a double screw extruder with two kneading zones. (Werner and Pfleiderer ZDSK28 extruder). The energy absorbed by the screws varies between about 0.50 and 1.50 KwH per Kg of resin and depends upon the type and amount of rubbery polymer therein. When the same resin is extruded in the same apparatus, but is subjected to a low shearing force, i.e., in the absence of any substantial phase inversion, the power absorbed by the screws is much less than that necessary to achieve phase inversion, and is generally about 20 to 40% thereof, producing thereby a rubber-modified copolymer having undesirable properties.

Any extrusion apparatus giving a high shear force is suitable for use in the instant invention. Such apparatus are well known to those skilled in the art and need not be described in detail here. Particularly preferred, for the purposes of the instant invention, are the twin-screw extruders. This type of extrusion apparatus comprises two screws which are juxtaposed side by side in the barrel of the extruder. Depending on the particular apparatus, the two screws can either be intermeshing, or non-intermeshing, and can be co-rotating or counter-rotating. Apparatus of this type is particularly preferred since it possesses a very high shear force. Suitable extrusion conditions include a stock temperature of from about 190° to 250° C., preferably approximately 215° C. The head pressure employed depends upon the design of the particular extruder utilized, and will, accordingly, vary from extruder to extruder. The particular extrusion conditions employed, however, depend, of course, upon the molecular weight and structure of the particular rubbery polymer present in the impact copolymer. Desirably, it is also preferred that the extrusion apparatus comprises a vented extruder.

In order to more fully describe the present invention, the following examples are presented which are intended merely to be illustrative and in nowise limitative.

In the following illustrative examples, measurements of physical properties of the polymers were made according to standard ASTM procedures.

EXAMPLE 1

A solution of a rubber (CARIFLEX TR 1102; Shell Maatschappij) in styrene and acrylonitrile monomers is prepared, containing 30% by weight of rubber, based on the total weight of monomer and rubber. The monomeric mixture comprises 865 g of styrene and 353 g of acrylonitrile. The viscosity of this rubber solution is 2920 centipoises at 65° C.

The rubber solution is then suspended in an aqueous mixture containing 2063 g of water, 3% by weight, based on water, of hydroxyapatite as suspending agent, and 0.94 g of a sodium ethoxylated laurylsulfate. The suspension mixture also contains 4.9 g of tert-dodecyl mercaptan as transfer agent.

After being suspended, the rubber-monomer solution is polymerized as follows. The suspension is heated at 129° C. for 3 hours, and then at 135° C. for 3 hours. Thereafter, 0.1% by weight, based on the weight of the monomers, of dicumyl peroxide is added to the suspension mixture while heating at 135° C. for 2 hours, after which time an additional amount of 0.12% by weight, based on the weight of the monomers, of dicumyl peroxide is added to the suspension mixture with additional heating at 135° C. for 2 hours.

Following completion of polymerization and recovery of the resulting ABS copolymer, the obtained copolymer is extruded with high shear force at an average temperature of 220° C. The shearing force, estimated by the energy absorbed by the extruder, a double screw extruder with two kneading zones manufactured by Werner and Pfleiderer under the trade designation ZDS K 28, is approximately 0.78 KwH/kg.

The treated ABS copolymer has the following properties:

| | | |
|---|---|---|
| Melt flow index: | 1.02 g/10' (under 10 kg) | ASTM D 1238-73 |
| Izod impact strength: | 7.72 ft lb/inch 5.51 ft lb/inch at −18° C. 4.04 ft lb/inch at −40° C. | ASTM D 256-73 |
| Falling dart: | 160 inch - lb | |
| Tensile strength at yield: | 4190 psi | |
| Tensile modulus: | $1.9 \times 10^5$ | ASTM 638-72 |
| Elongation: | 85% | |
| Gloss: | 76% | ASTM 523-67 (1972) |

By way of comparison, the above procedure is repeated but the copolymer is extruded without a high shear force. The energy absorbed by the extruder is 0.3 KwH/kg. The falling dart of the resulting low shear extruded resin is only 41 inch-lb.

EXAMPLE 2

A solution of a butadiene-styrene rubber containing 22 weight percent styrene (Firestone Tire & Rubber Co. Stereon 703A) in styrene and acrylonitrile monomers is prepared. This solution contains 13% by weight, based on the weight of the monomers and rubber, of rubber, and 21.3 kg of styrene and 8.7 kg of acrylonitrile. The viscosity of the rubber solution is 625 centipoises at 65° C.

The rubber solution is suspended in an aqueous mixture containing 42.3 kg of water, 3% by weight, based on water, of hydroxyapatite as suspending agent, and 6.6 g of a sodium dodecylbenzenesulfonate. The suspension mixture also contains 57 g of tert-dodecylmercaptan as transfer agent.

The resulting suspension is then submitted to the same polymerization conditions as described in Example 1.

At the end of the suspension polymerization step, the resulting ABS copolymer is extruded with high shear at an average temperature of 220° C. The shear force, estimated by the energy absorbed by Werner and Pfleiderer ZDS K 28 extruder, is 0.50 KwH/kg.

The properties of the resulting ABS copolymer are shown in Table I. By way of comparison, the same procedure is repeated, but the copolymer is extruded without a high shear force. The energy absorbed by the extruder is 0.18 KwH/kg. Also shown in Table I is a comparison of the properties of the copolymers in accordance with the process of the instant invention with the properties of two copolymers having the same rubber content but prepared according to the conventional two-step polymerization process (bulk prepolymerization and then suspension polymerization).

TABLE I

|  | Extrusion with high shear force | Extrusion without high shear force | Usual two-step process | Usual two-step process |
|---|---|---|---|---|
| Melt flow index (g/10') (under 10 kg) | 2.04 | 1.41 | 2.39 | 1.44 |
| Vicat (°C.) | 98 | 98 | 97.8 | 95.7 |
| Izod impact strength |  |  |  |  |
| -at 25° C. | 6.63 | 5.30 | 4.8 | 3.3 |
| -at −18° C. | 2.20 | 1.94 | 1.57 | 1.08 |
| (ft lb/inch) |  |  |  |  |
| Falling dart (inch-lb) | 35 | 17 | 26 | 20 |
| Tensile strength at yield (psi) | 5700 | 5100 | 6198 | 5762 |
| Elongation (%) | 83 | 94 | 63 | 54 |
| Viscosity of the mass at the time of the suspension (centipoises) |  |  | 96,000 | 24,000 |

The foregoing data clearly establish that not only do the copolymers of the present invention exhibit superior properties to identical copolymers not subjected to high shear force, i.e., the conventional suspension copolymers, but also exhibit impact strengths, falling dart, and percent elongation values superior to identically comprised copolymers produced in the typical two-step method.

EXAMPLE 3

13 parts of a polybutadiene rubber with a solution viscosity of 120 centistokes, manufacture under the tradename Diene 35 by the Firestone Tire & Rubber Company, are dissolved in a vessel equipped with a condenser and stirrer containing a mixture of 25 parts acrylonitrile, 62 parts styrene, 3.5 parts dioctylphthalate, and 0.17 parts tertdodecyl mercaptan. The reactor is then purged with nitrogen three times and heated with continuous agitation to a temperature of approximately 65° C. whereat the solution has a viscosity of 1,800 cps. The solutions are then suspended in 100 parts of water containing 3% hydroxyapatite and 0.02% of an anionic surfactant. After adjusting the pH of the suspension to a value between about 6.5 to 7 and adjusting the reactor pressure to about 5 psig, the suspension is polymerized with continuous agitation.

For 5 hours the reaction mixture is maintained at approximately 125° C., followed by 2 hours at 128° C. Thereafter, 0.09 parts of dicumyl peroxide are added, and the polymerization is thereafter continued for 3 hours at 135° C. to substantial completion. Upon completion of the polymerization, the mixture is cooled, the reactor opened, and the copolymer beads are recovered from the aqueous phase by centrifugation.

After drying, the resultant beads of ABS resin are extruded on a 1 inch double screw extruder with two kneading zones, manufactured by Werner and Pfeideler under the designation ZDS K 28, with a 200° C. stock temperature.

The resultant ABS copolymer exhibits the following properties:
Izod: 9.33 ft-lb/inch
Falling dart: 36 inch-lb
Tensile strength at yield: 5,692 psi
Tensile modulus: 2.86 $10^5$ psi
Elongation: 62%
Melt flow: 0.25 g/10 min. (10 kg—200° C.)

EXAMPLE 4

20 parts of a butadiene-styrene rubber containing 25% styrene located at random in the butadiene chain, with a solution viscosity of 45 cps, manufactured by the Firestone Tire & Rubber Company under the trade designation Stereon 702, are dissolved in a mixture of 23 parts acrylonitrile, 57 parts styrene, 0.16 parts tertiary-dodecyl mercaptan, and 3.5 parts dioctylphthalate.

Following a procedure similar to that of Example 3, the resulting solution is heated to 65° C. with continuous agitation at which temperature it exhibits a viscosity of 5,000 cps. The solution is suspended in 100 parts of water containing 3% hydroxyapatite and 0.02% of an anionic surfactant. The resulting suspension is then subjected to polymerization under the following conditions:

For 3 hours the reaction mixture is maintained at 129° C., followed by 2 hours at 135° C. Thereafter, 0.08 parts dicumyl peroxide are added and the polymerization is continued for another 2 hours. At the end of this 2-hour period, a second portion of catalyst, comprising 0.08 parts dicumyl peroxide are added, and reaction is then continued for another 2 hours at 135° C.

At the end of the polymerization, the resulting beads of ABS copolymer are extruded under identical conditions as described in Example 3. The polymer produced in this example has the following properties:
Izod: 8.72 ft-lb/inch
Falling dart: 100 inch-lb
Tensile strength at yield: 4,818 psi
Tensile modulus: 2.15 $10^5$ psi
Elongation: 92%
Melt flow index: 0.32 g/10 min. (10 kg-200° C.).

EXAMPLE 5

The experiment of Example 4 is repeated, employing however 0.32 parts of the tert-dodecyl mercaptan chain regulating agent. The resulting reaction mixture is then suspended, polymerized, and extruded identically as described in Example 4, yielding an ABS polymer having the following properties:
Izod: 8.07 ft-lb/inch
Falling dart: 90 inch-lb
Tensile strength at yield: 5,040 psi
Tensile modulus: 2.14 $10^5$ psi
Elongation: 90%
Melt flow index: 1.2 g/10 min. (10 kg-200° C.).

EXAMPLE 6

25 parts of a styrene-butadiene diblock rubber containing about 25% styrene, and with a solution viscosity of 10 centistokes, manufactured by the Phillips Petroleum Company under the trade designation Solprene 1205, are dissolved in a mixture of 22 parts acrylonitrile, 53 parts styrene, and 0.3 parts tert-dodecyl mercaptan. The resulting solution of polymerizable material is then heated with continuous agitation to 65° C. at which temperature it has a viscosity of 2,350 cps. At this temperature, the reaction mixture is then suspended, polymerized, and the resulting polymer extruded in accordance with the procedure described in Example 4. The high rubber content ABS polymer produced in this example, is found to have the following properties:
Izod: 9.49 ft-lb/inch
Falling dart: 108 inch-lb
Tensile strength at yield: 4,653 psi Tensile modulus: 2.03 10⁵ psi
Elongation: 7%
Melt flow index: 1.6 g/10 min. (10 kg-200° C.)
Gloss: 8%.

EXAMPLE 7

30 parts of a triblock rubber of styrene-butadiene-styrene (15:70:15) with a solution viscosity of 10 centistokes, manufactured by the Shell Petroleum Company under the tradename Kraton 1102, are dissolved in a mixture of 20 parts acrylonitrile, 50 parts styrene, and 0.28 parts tert-dodecyl mercaptan. At 65° C., the resulting solution exhibits a viscosity of 2,000 cps. Thereafter, the solution is suspended in 100 parts of water containing 3% hydroxyapatite and 0.02% of an anionic surfactant. Following suspension, the reaction mixture is heated and maintained at 120° C. with continuous agitation for 7 hours. At the end of this period, 0.07 parts dicumyl peroxide are added and the polymerization is continued until the density of the polymer beads is higher than the density of the water phase. Thereafter, polymerization is completed by heating the mixture at 135° C. for 4 hours.

After cooling and recovering of the polymer beads from the suspension, the ABS polymer produced in this experiment is extruded under identical conditions as described in Example 3. This polymer has the following properties:

Izod: 12.1 ft-lb/inch
Falling dart: 160 inch-lb
Tensile strength at yield: 5,187 psi
Tensile modulus: 2.54 10⁵ psi
Elongation: 71%
Melt flow index: 0.8 g/10 min. (10 kg-200° C.)
Gloss: 82%.

The foregoing examples clearly illustrate that rubber-modified styrene copolymers, exhibiting excellent impact properties and surface appearance, may be successfully prepared by suspension polymerization by extruding the resulting copolymer beads under conditions of high shear force sufficient to homogeneously disperse the rubber polymer throughout the copolymer. Moreover, these examples clearly illustrate that ABS polymers having high concentrations of rubber may be successfully produced in a single suspension step without the mass prepolymerization step which has heretofore been thought to be essential for commercial production of these polymers. Accordingly, the present invention provides a particularly simple and economical method for the manufacture of rubber-modified styrene copolymers, and particularly high rubber content rubber-modified styrene copolymers.

While the invention has now been described in terms of certain preferred embodiments, and illustrated by numerous examples, the skilled artisan will readily appreciate that various modifications, changes, substitutions, and omissions, may be made without departing from the spirit thereof. Accordingly, it is intended that the scope of the present invention be limited solely by the scope of the following claims.

What is claimed is:

1. A process for the production of rubber-modified vinyl aromatic copolymers having improved surface appearance and impact properties by suspension copolymerization, consisting essentially of the steps of:
   (a) forming an aqueous suspension of an admixture of polymerizable materials comprising vinyl aromatic monomer and rubbery polymer;
   (b) suspension polymerizing said admixture of polymerizable materials at a temperature between about 60° and 150° C. to a residual monomer content less than about 2% by weight to produce a rubber-modified vinyl aromatic copolymer comprising polymerized monomer dispersed in a gel-containing rubber phase;
   (c) recovering beads of said copolymer containing cross-linked rubber and having a high macrogel content from said suspension; and
   (d) causing phase inversion of said copolymer by melt extruding said copolymer under extrusion conditions having a shear force sufficient to induce phase inversion and produce a substantially gel-free rubber-modified vinyl aromatic copolymer comprising a continuous phase of polymerized vinyl aromatic monomer in which grafted rubbery polymer is homogeneously dispersed therethrough.

2. The process of claim 1, wherein said vinyl aromatic monomer is styrene.

3. The process of claim 2, wherein said rubbery polymer is selected from the group consisting of polybutadiene and styrene-butadiene rubbers.

4. The process of claim 3, wherein said rubbery polymer is polybutadiene.

5. The process of claim 3, wherein said rubbery polymer is styrene-butadiene rubber.

6. The process of claim 3, wherein said admixture of polymerizable materials comprises from about 3 to 50% by weight rubbery polymer relative to the total amount of polymerizable materials, with the remainder of the polymerizable material being styrene monomer.

7. The process of claim 6, wherein said admixture of polymerizable materials comprises from about 10 to 40% by weight rubbery polymer.

8. The process of claim 6, wherein said admixture of polymerizable materials comprises from about 20 to 30% by weight rubbery polymer.

9. The process of claim 3, wherein said admixture of polymerizable materials further comprises an additional monomer copolymerizable with said styrene monomer and rubbery polymer selected from the group consisting of acrylonitrile monomer, methacrylate monomer, and mixtures thereof.

10. The process of claim 9, wherein said admixture of polymerizable materials comprises from about 3 to 50% by weight rubbery polymer, with the remainder of said polymerizable materials being styrene monomer and methacrylate monomer, from about 40 to 60% of the total sum of styrene and methacrylate being methacrylate monomer.

11. The process of claim 10, wherein said admixture of polymerizable materials comprises from about 10 to 40% by weight rubbery polymer.

12. The process of claim 10, wherein said admixture of polymerizable materials comprises from about 20 to 30% by weight rubbery polymer.

13. The process of claim 9, wherein said admixture of polymerizable materials comprises from about 3 to 50% by weight rubbery polymer, from about 10 to 35% by weight acrylonitrile monomer, and from about 20 to 80% by weight styrene monomer.

14. The process of claim 13, wherein said admixture of polymerizable materials comprises from about 10 to 40% by weight rubbery polymer.

15. The process of claim 13, wherein said admixture of polymerizable materials comprises from about 20 to 30% by weight rubbery polymer.

16. The process of claim 3, wherein said copolymer is extruded in a twin-screw extruder.

17. The process of claim 3, wherein said extrusion conditions further include a stock temperature of from about 190° to 250° C.

18. The process of claim 17, wherein said stock temperature is approximately 215° C.

19. The process of claim 3, wherein said admixture of polymerizable materials further comprises a chain regulating agent.

20. The process of claim 19, wherein said chain regulating agent is tertiary-dodecylmercaptan.

21. The process of claim 19, wherein said aqueous suspension is formed by mixing said admixture of polymerizable material with water, and thereafter adding an aqueous dispersion of a suspending agent and a surfactant to the admixture.

22. The process of claim 21, further comprising adding a free radical polymerization catalyst to said suspension.

23. The process of claim 22, wherein said polymerization catalyst comprises dicumyl peroxide.

24. The process of claim 21, wherein said suspension of polymerizable materials is polymerized by initially reacting said polymerizable materials at a temperature within the range of from about 120° to 130° C. for a period of time sufficient to produce beads of copolymer having a specific gravity higher than that of the aqueous phase, and thereafter increasing the reaction temperature to a temperature from about 1° to 15° C. higher than said lower temperature and reacting said polymerizable materials for a period of time sufficient to produce a concentration of residual monomers of from about 0.5 to 2% by weight.

25. The process of claim 24, wherein said suspension is polymerized at said higher temperature for a period of time sufficient to produce a concentration of residual monomers of from about 0.2 to about 0.4% by weight.

26. A process for the production of ABS type copolymers, comprising a copolymer of vinyl aromatic monomer, acrylonitrile monomer, and rubbery polymer having improved surface appearance and impact properties by suspension copolymerization, consisting essentially of the steps of:
   (a) forming an aqueous suspension of an admixture of polymerizable materials comprising said vinyl aromatic monomer, said acrylonitrile monomer and said rubbery polymer;
   (b) suspension polymerizing said admixture of polymerizable materials at a temperature between about 60° to 150° C. to a residual monomer content less than about 2% by weight to produce an ABS copolymer comprising polymerized monomers dispersed in a gel-containing rubber phase;
   (c) recovering beads of said copolymer containing cross-linked rubber and having a high macrogel content from said suspension; and
   (d) causing phase inversion of said copolymer by melt extruding said copolymer under extrusion conditions having a shear force sufficient to cause phase inversion and produce a substantially gel-free ABS copolymer comprising a continuous phase comprising vinyl aromatic monomer-acrylonitrile copolymer in which grafted rubber polymer is homogeneously dispersed therethrough.

27. The process of claim 26, wherein said vinyl aromatic monomer is styrene.

28. The process of claim 27, wherein said rubbery polymer is selected from the group consisting of polybutadiene and styrene-butadiene rubbers.

29. The process of claim 28, wherein said rubbery polymer is polybutadiene.

30. The process of claim 28, wherein said rubbery polymer is styrene-butadiene rubber.

31. The process of claim 28, wherein said admixture of polymerizable materials comprises from about 3 to 50% by weight rubbery polymer, from about 10 to 35% by weight acrylonitrile monomer, and from about 20 to 80% by weight styrene monomer.

32. The process of claim 31, wherein said admixture of polymerizable materials comprises from about 10 to 40% by weight rubbery polymer.

33. The process of claim 31, wherein said admixture of polymerizable materials comprises from about 20 to 30% by weight rubbery polymer.

34. The process of claim 33, wherein said ABS copolymer is extruded in a twin-screw extruder.

35. The process of claim 29, wherein said extrusion conditions further include a stock temperature of from about 190° to 250° C.

36. The process of claim 35, wherein said stock temperature is approximately 215° C.

37. The process of claim 28, wherein said admixture of polymerizable material further comprises a chain regulating agent.

38. The process of claim 37, wherein said chain regulating sheet comprises tertiary-dodecylmercaptan.

39. The process of claim 37, wherein said aqueous suspension is formed by mixing said admixture of polymerizable materials with water, and thereafter adding an aqueous dispersion of a suspending agent and a surfactant to said admixture.

40. The process of claim 39, wherein said suspending agent is tricalcium phosphate.

41. The process of claim 39, further comprising adding a free radical polymerization catalyst to said suspension.

42. The process of claim 41, wherein said polymerization catalyst comprises dicumyl peroxide.

43. The process of claim 39, wherein said suspension of polymerizable materials is polymerized by initially reacting said polymerizable materials at a temperature within the range of from about 120° to 135° C., for a period of time sufficient to produce beads of copolymer having a specific gravity higher than that of the aqueous phase, and thereafter increasing the reaction temperature to a temperature from about 1° to 15° C. higher than said lower temperature and reacting said polymerizable materials for a period of time sufficient to produce a concentration of residual monomers of from about 0.05 to 2% by weight.

44. The process of claim 43, wherein said suspension is polymerized at said higher temperature for a period of time sufficient to produce a concentration of residual monomers of from about 0.2 to 0.4% by weight.

45. The rubber-modified styrene copolymer produced by the method of claim 7.

46. The rubber-modified styrene copolymer produced by the method of claim 8.

47. The ABS type copolymer produced by the method of claim 32.

48. The ABS type copolymer produced by the method of claim 33.